United States Patent [19]

Fukuma

[11] 3,725,656

[45] Apr. 3, 1973

[54] COMPUTING SYSTEM FOR USE IN PRICE INDICATING BALANCE

[75] Inventor: Yoshitakaka Fukuma, Nara-ken, Japan

[73] Assignee: Sharp Kabushiki Kaisha, Osaka, Japan

[22] Filed: Feb. 22, 1971

[21] Appl. No.: 117,346

[30] Foreign Application Priority Data

Feb. 23, 1970 Japan ..................................45/15433
Feb. 23, 1970 Japan ..................................45/15434

[52] U.S. Cl..............................235/151.33, 177/25
[51] Int. Cl........................G01g 19/413, G06f 15/20
[58] Field of Search .......235/151.33; 177/25, 26, 12, 177/3

[56] References Cited

UNITED STATES PATENTS 3,612,842 10/1971 Aga et al. ..........................235/151.33
3,109,091 10/1963 Allen ...........................235/151.33 X
3,557,353 1/1971 Allen et al. .......................235/151.33
3,205,956 9/1965 Bell et al. ..................................177/3
3,393,302 7/1968 Cichanowicz et al. ..........235/151.33

Primary Examiner—Malcolm A. Morrison
Assistant Examiner—Edward J. Wise
Attorney—Flehr, Hohbach, Test, Albritton & Herbert

[57] ABSTRACT

A balance combined with a computing system is capable of multiplying unit price by weight and indicating price in digital form. The price indicating balance has a computing system wherein new weight signals are successively compared with previous stored weight signals and the fluctuation of the measured weight signals due to initial oscillator motion of the weighing pan allows price calculation to start.

12 Claims, 20 Drawing Figures

FIG_3

INVENTOR.
YOSHITAKA FUKUMA

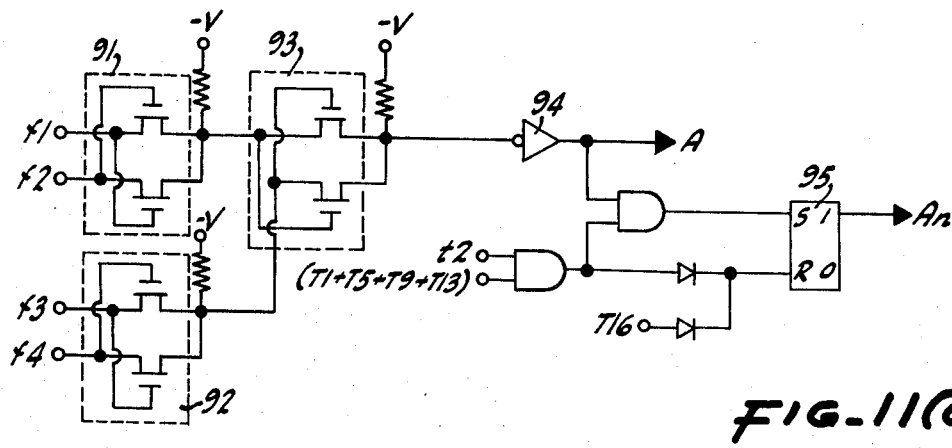
FIG_11(a)
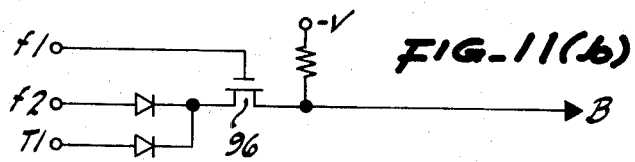
FIG_11(b)
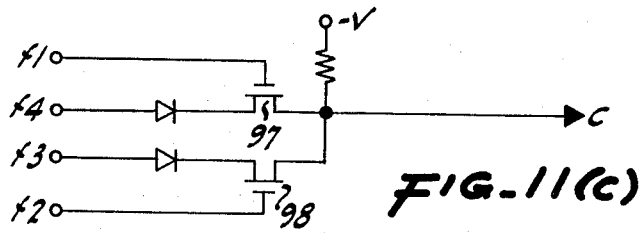
FIG_11(c)
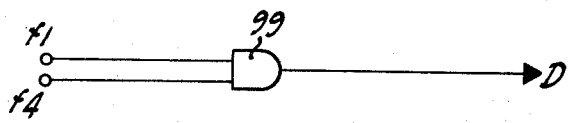
FIG_11(d)
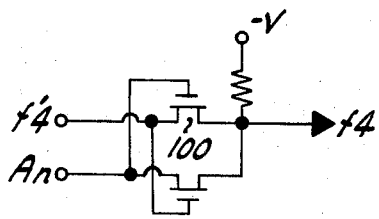
FIG_11(e)
INVENTOR.
YOSHITAKA FUKUMA
BY
Flehr, Hohbach, Test,
Albritton & Herbert
ATTORNEYS INVENTOR.
YOSHITAKA FUKUMA
BY
Flehr, Hohbach, Test,
Albritton & Herbert
ATTORNEYS

FIG.14

COMPUTING SYSTEM FOR USE IN PRICE INDICATING BALANCE

BACKGROUND OF THE INVENTION

This invention relates to a price indicating balance, and more particularly to an improved price indicating balance having an electronic computing system capable of multiplying unit price by weight signals.

An ordinary mechanical balance for commercial use employs the analog indication system. A mechanical balance combined with an A-D converter and a computing system is capable of multiplying unit price by weight signals and also of indicating the resulting price in digital form. The A-D converter is operative to convert the measured weight signals in analog form into digital form. In response to the setting of price signals, the computing system coupled to the A-D converter is operative to automatically calculate the price of an article to be measured.

According to conventional price indicating balance practice, calculation start signals are always generated at regular intervals, while the weight is electrically and nonperiodically detected in response to the displacement speed of pan. Thus, arithmetic operation such as price calculation is periodically carried out at the fixed interval. When the price calculation is repeatedly carried out, visual indication of the resulting price flickers in output means coupled to the computing system. Such flickering indication makes consumers doubt the accuracy of the final indication.

In another type machine, after the article is mounted on the pan, a stabilized state of a displacements response of a pan is detected in the lapse of transient time by an electrical circuit arrangement and thereafter a computing system is set in an operational state.

Such circuit arrangement is, however, complex and expensive. In order to detect the stabilized state of the displacements response, a decision is required for all the bits of the weight information. The weight detection circuit arrangement should be, therefore, composed of a plurality of detection units the number of which corresponds to the bit number of weight information. The detection unit is designed to sense a code marker attached to the scale plate, the code marker corresponding to each bit of the weight information. In case of optically or magnetically coded sending, a plurality of DC amplifiers are furthermore needed. It is difficult to adjust the gains of all the DC amplifiers uniformly. And, the next succeeding Schmitt circuit does not respond to extremely slow movements of the pan. Furthermore, the price calculation will not be carried out until the displacements response of the pan is stabilized. Thus, the computing system of such machine would be inoperative under the influence of ambient conditions for example a wind and so forth. Considering the influence of the ambient conditions, the sensitivity of weight detecting element is lowered to counteract said disadvantage. Thus, errors in sensing the weight become large.

OBJECTS AND SUMMARY OF THE INVENTION

Accordingly, the primary object of this invention is to provide an improved computing system for use in price indicating balance which avoids one or more of the disadvantages and limitations of the above conventional system.

Another object of this invention is to provide an improved price indicating balance which ensures a high reliability.

Still another object of this invention is to provide a price indicating balance which has the simplest circuit construction for weight detection.

A further object of this invention is to provide a computing system for a price indicating balance which is capable of successively multiplying unit price by the detected weight signals and indicating correct resulting price, at every fluctuation of the detected weight signals.

It is still a further object of this invention to provide a price indicating balance which gives a visual stabilized indication of the resulting price in digital form.

Another object of this invention is to provide a price indicating balance which needs no reduction of sensitivity of the weight detecting mechanism.

Still another object of this invention is to provide an indicating system for use in a price indicating balance which is so designed that price indication is inhibited in case of weighing beyond its limits.

In summary, this invention refers primarily to an improved computing system for use in a price indicating balance which comprises means for converting weight of an article to be weighed into electric information, means for multiplying unit price by the converted weight information, means for detecting variations of the weight information due to initial oscillatory movement when the article is placed on the balance and also for causing the multiplying operation to start by detection of said variations, and means for indicating the resulting price.

BRIEF DESCRIPTION OF THE DRAWINGS

FIGS. 11(a) through 11(e) are circuit diagrams showing the Gray code-to-BCD code converter arrangement.

FIG. 14 is a table showing various placements of weight, unit price and resulting price information.

DESCRIPTION OF THE PREFERRED EMBODIMENTS

Outline of the Price Indicating Balance (FIGS. 1 – 4)

Figure 1:
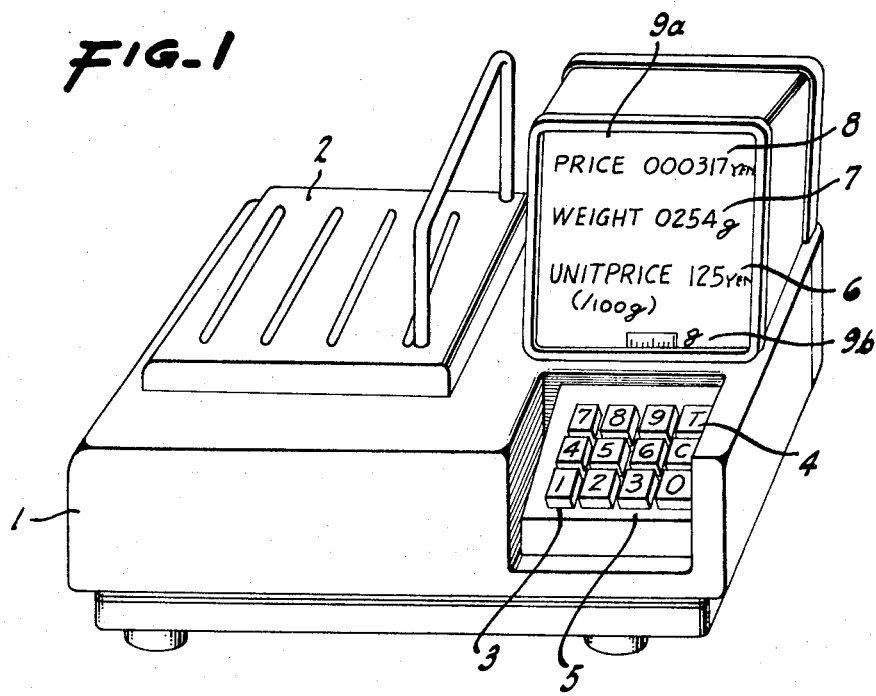
FIG. 1 is a perspective view of the price indicating balance.

A price indicating balance 1 as shown in FIG. 1 possesses a pan 2 on which an article to be weighted is mounted. Of course, the pan 2 is mechanically interlinked with the following weight detection arrangement. The price indicating balance 1 also possesses an input keyboard 5 wherein 10 numerical keys 3 are provided to introduce unit price information and a function key 4 is provided to instruct tare calculation. In addition, the balance 1 has a indication window 9a for indicating information in digital form such as unit price information 6, weight information 7 and resulting price information 8, and another window 9b for indicating weight information in analog form. The price indicating balance is capable of weighing in a range of, for example, from 0 to 3,000 grams. The unit price information is introduced as price per 100 grams not but per 1 gram because of limitations on weighing and calculating ability. The price information is altogether indicated with six digits, and the weight and unit price information is respectively indicated with four digits and three digits.

Figure 4:
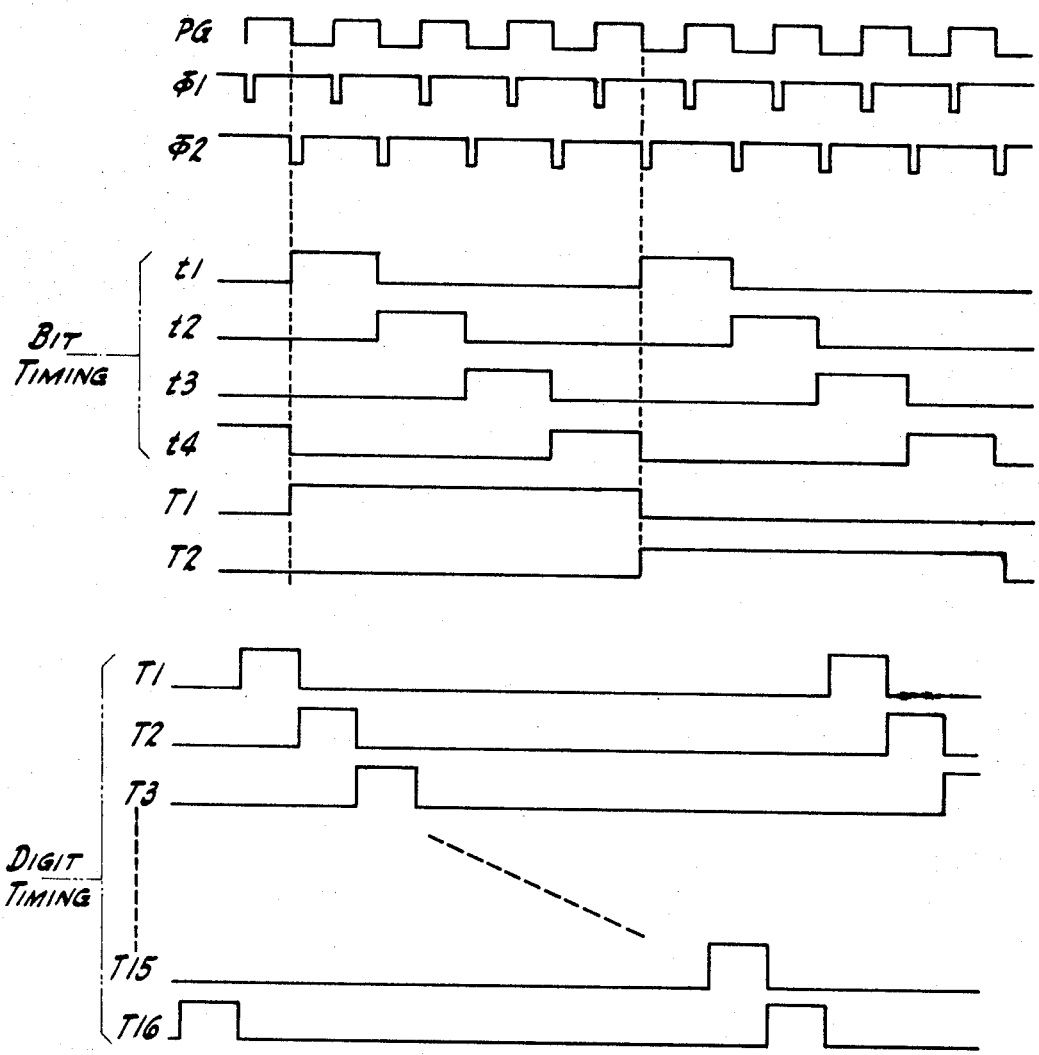
FIG. 4 is a timing chart showing the relative phases of the timing signals.
Figure 6:
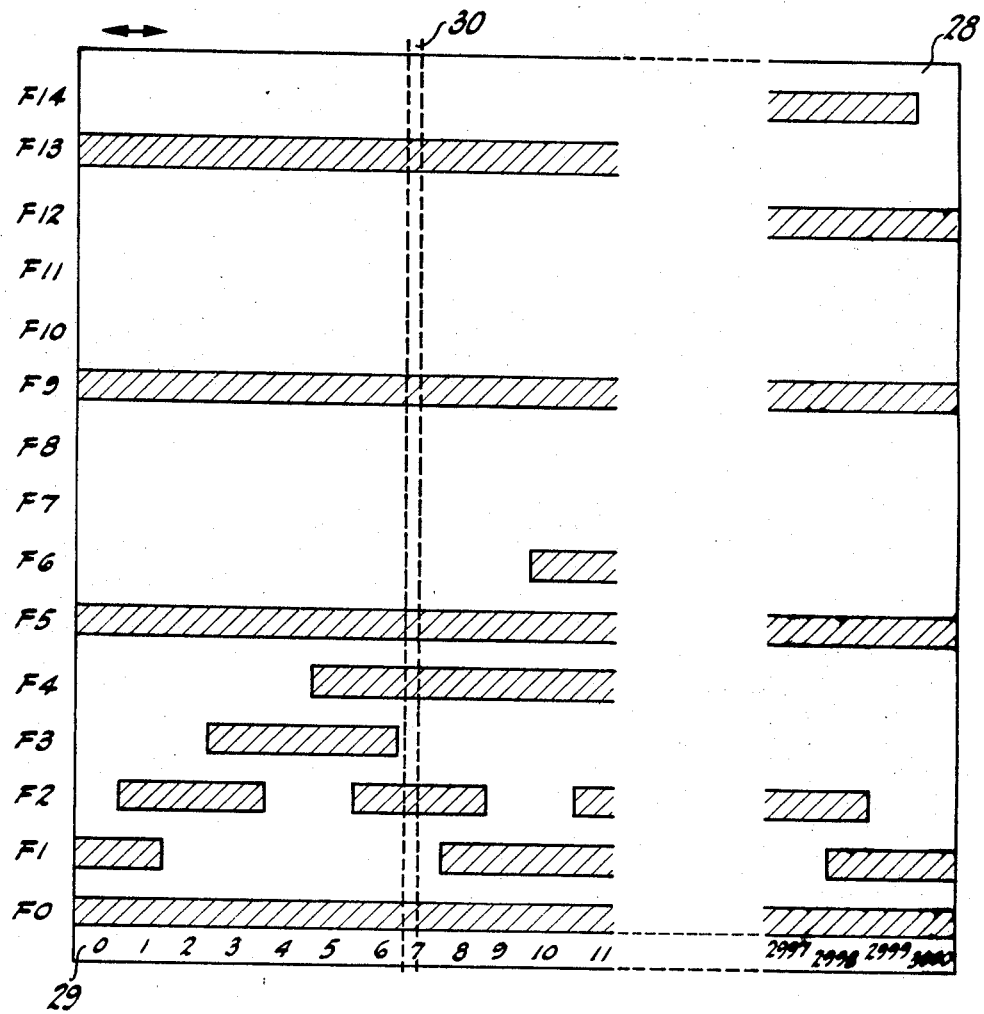
FIG. 6 is a graph showing an example of code markers attached to the scale plate.

A computing system for the price indicating balance is subjected to synchronization control by various timing signals as shown in FIG. 4. Each word time is divided into 16 digit times T1 through T16. During three digit times, T2 through T4, data processing of unit price information is carried out, during four digit times data processing of weight information, and during six digit times data processing of price information are respectively carried out. And, data processing is generally into 5 steps, Q1 through Q5.

Figure 2:
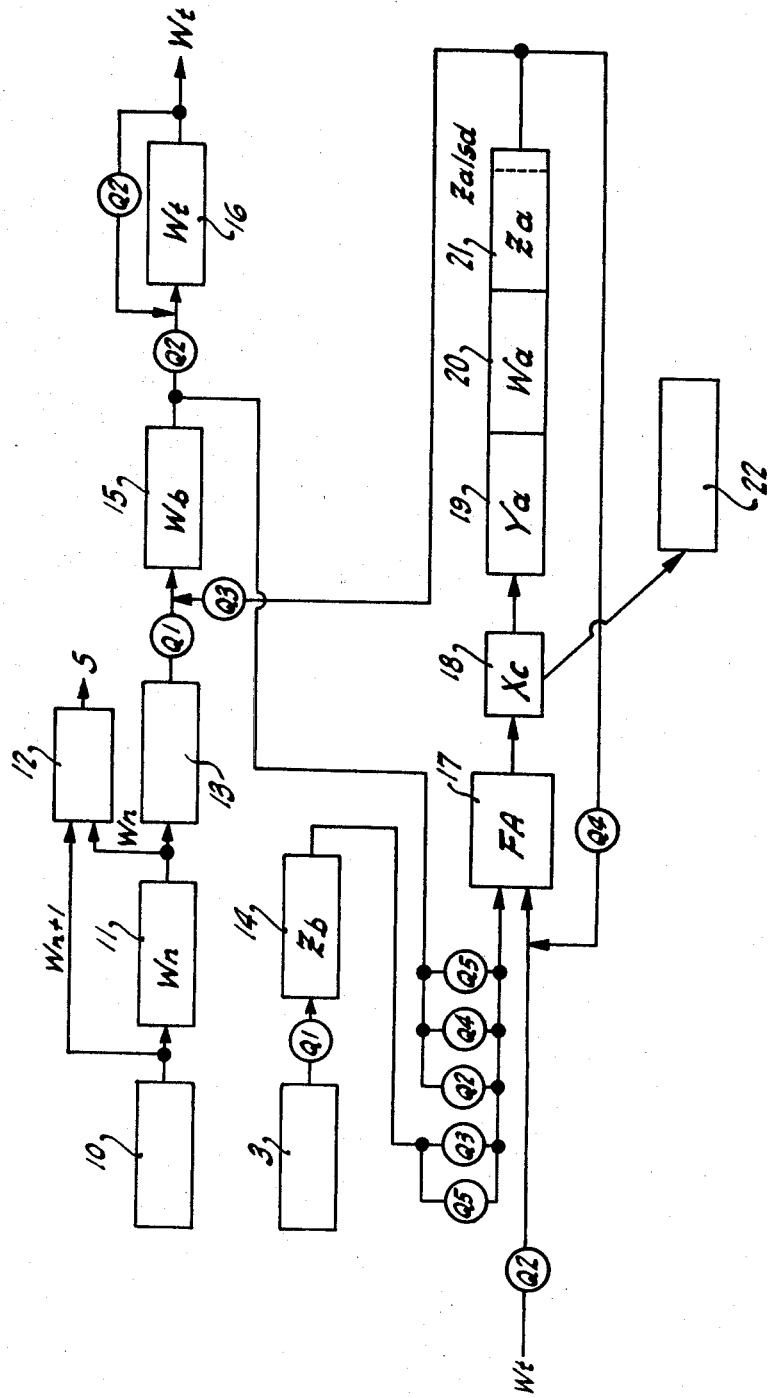
FIG. 2 is a block diagram showing the construction of the price indicating balance in accordance with this invention.

An electric arrangement of the price indicating balance which consists essentially of weight detection system, information storage system and calculating system, is schematically shown in FIG. 2. The weight detection system comprises a photo-electrically sensing and A-D converting circuit 10, a temporary storage register 11 for the converted weight signals, a comparator 12 and the Gray code-to-BCD code converter 13. The information storage system comprises a first unit price register 14, a first weight register 15 and a tare register 16. The calculating system comprises a full-adder 17, a buffer register 18, a price register 19, a second weight register 20 and a second unit price register 21. In addition, an input system comprises 10 keys 3 and an output system comprises indication circuit 22.

Figure 3:
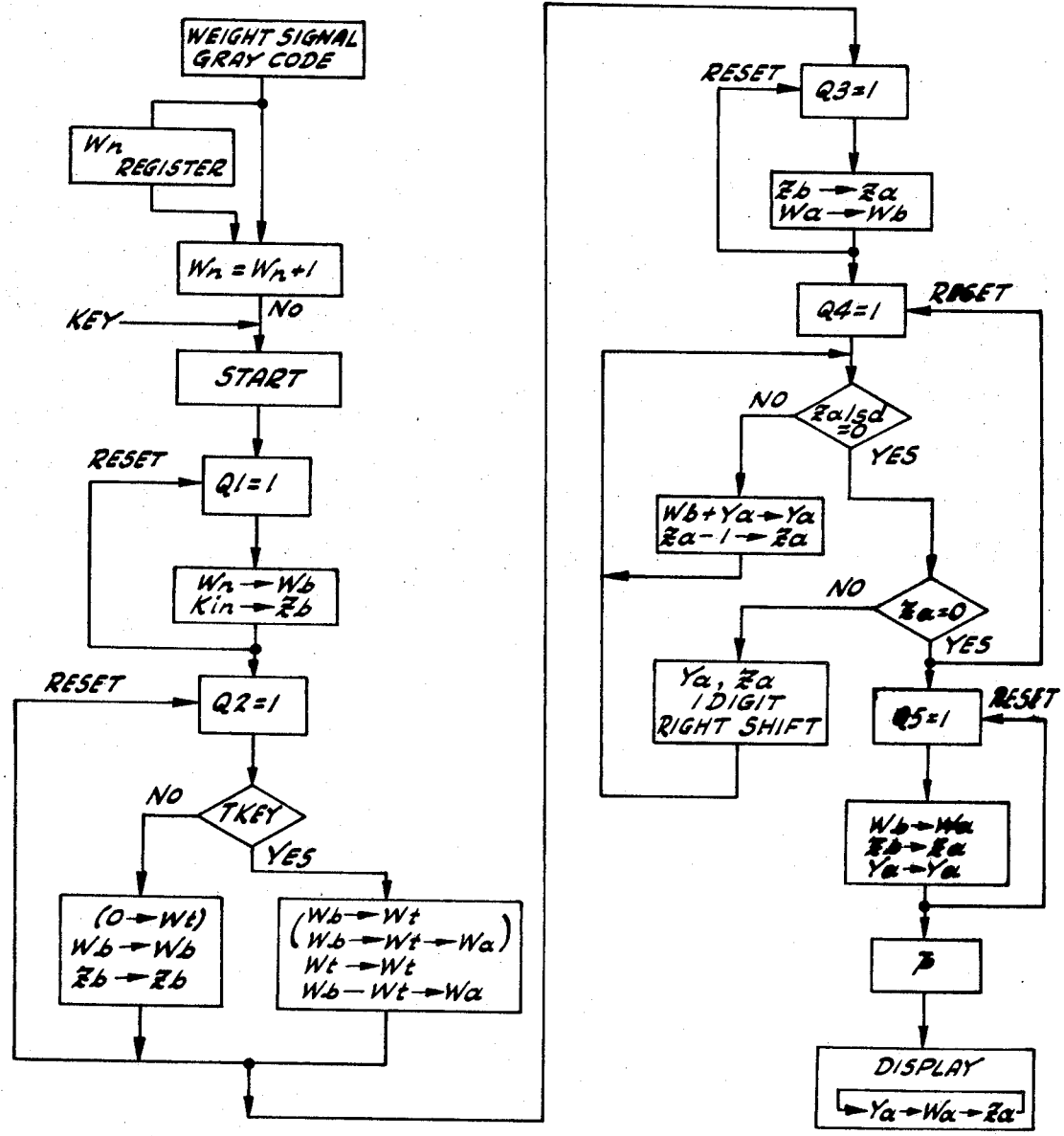
FIG. 3 is a flow chart showing processes of price calculation in accordance with this invention.

With the displacement of the pan the code markers attached to the scale plate are photoelectrically sensed in digital form. The sensed electric signals represent the weight in the Gray codes. The weight signals $Wn$ are temporarily stored in the register 11. The stored weight signals $Wn$ and new weight signals $Wn+1$ are compared by the comparator 12 and where disagreement is found a calculation start signal S is read out. Referring to FIG. 3, the appearance of the start signal S results in shifting to a first processing step Q1.

In the first processing step Q1, the Gray code weight signals $Wn$ are changed into binary coded decimal code signals through the code converter 13 and thereafter the changed weight information $Wb$ is stored in the first weight register 15. In a case where the numerical keys 3 are depressed to introduce unit price information, a start signal is read out and unit price information $Zb$ and the changed weight information $Wb$ is respectively stored in the first unit price register 14 and the first weight register 15.

It is next shifted to the second processing step Q2 wherein the tare calculation is carried out. If the tare key is not depressed, the stored contents $Wb$ and $Zb$ of the weight register 15 and unit price register 14 are maintained as they are and the next processing step Q3 is prepared. IF the tare calculation is directed, the stored contents $Wb$ of the weight register 15 are subtracted by that of the tare register 16 through the full-adder 17 and its resultant is stored in the second weight register 20. At the moment of depressing the stored contents $Wb$ of the weight register 15 are stored in the tare register 16.

The processing control is advanced into the third step Q3. The contents $Zb$ are transferred from the first unit price register 14 to the second unit price register 21 through the full-adder 17 and buffer register 18, and the net weight information $Wa$ (minus weight of the tare) stored in the register 20 is returned back to the first weight register 15.

During the next succeeding fourth step Q4 the price calculation (unit price X weight = price) is taken up. Namely, the digit $Za1sd$ of the least significant digit place of the register 21 wherein the unit price information $Za$ per 100 grams is stored and judged whether it is zero or not. If not zero, the stored contents $Wb$ and $Ya$ of the weight and price registers 15 and 19 are added together by means of the full-adder 17 and its resultant is stored in the price register 19, and furthermore the stored contents $Za$ of the register 21 are subtracted by one. These operations would be repeated until the least significant digit $Za1sd$ reaches zero. IF it becomes zero, the stored contents $Ya$ and $Za$ of the first and second price registers 19 and 20 are shifted to the right by one digit place and the above-mentioned repeat addition is again carried out. The above consecutive operation would be allowed to repeat until the stored contents $Za$ of the register 21 become zero. Thereafter the resulting price information is obtained from the second price register 19.

The fifth step Q5 is active after the termination of the above price calculation. In this step Q5 the stored contents $Wb$ and $Zb$ of the first weight and unit price registers 15 and 14 are again transferred to the second registers 20 and 21. In the final step the processing control is shifted from the calculation cycle to noncalculation cycle P. A series of four-bit signal stored in the buffer register 18 is successively read out and applied to the indication device 22. The price, weight and unit price information stored in the registers 19, 20 and 21 is visually indicated.

Weight Detection (FIGS. 5 – 9

Figure 5:
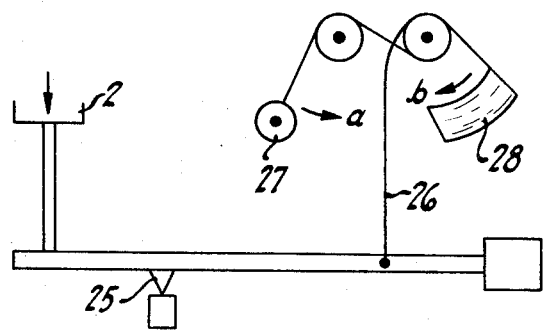
FIG. 5 is a graph showing a mechanism of weight detection arrangement.

The operating principle of weight detection is shown in FIG. 5. On moving the pan 2 its displacement response is transferred to cause a steel tape 26 to bend. In proportion to the pan displacement a pendulum 27 and code scale 28 are respectively moved in the direction shown by arrows $a$ and $b$ to allow a fulcrum 25 to balance. The displacement which is proportional to the weight of an article to be weighed may be readout by photo-electrically sensing a code pattern shown in FIG. 6. This drawing illustrates a typical pattern attached to the code scale 28 for converting the analog weight in a range from 0 to 3,000 grams into the Gray coded digital information as one unit of 1 gram. The shaded line portions in this drawing show punched portions. F1 – F4 codes represent the Gray code pattern of the least significant digit of the weight information. The relationship between the F1 – F 4 Gray codes and decimal numbers is shown in the following Table 1.

TABLE 1

| Code number | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| F1 | 1 | 1 | 0 | 0 | 0 | 0 | 0 | 0 | 1 | 1 | 1 | 1 | 0 | 0 | 0 | 0 | 0 | 0 | 1 | 1 | 1 |
| F2 | 0 | 1 | 1 | 1 | 0 | 0 | 1 | 1 | 1 | 0 | 0 | 1 | 1 | 1 | 0 | 0 | 1 | 1 | 1 | 0 | 0 |
| F3 | 0 | 0 | 0 | 1 | 1 | 1 | 1 | 0 | 0 | 0 | 0 | 0 | 0 | 1 | 1 | 1 | 1 | 0 | 0 | 0 | 0 |
| F4 | 0 | 0 | 0 | 0 | 0 | 1 | 1 | 1 | 1 | 1 | 1 | 1 | 1 | 1 | 1 | 0 | 0 | 0 | 0 | 0 | 0 |

As is well known, only one code state differs between the code combinations of the neighboring two decimal weight signals. However, the code combinations F1 – F4 of decimal numbers 9 and 10 are identical other than codes in $10^1$ digit place. The code combination F1 – F4 of the decimal numbers 0 – 19 is similarly applied to combinations more than 20. The codes F5 – F8 and F9 – F12 represent respectively the code combinations in $10^1$ and $10^2$ digit places of the weight information with a tenfold and a hundredfold the lengths of the code combination F1 – F4. Code combination in the $10^3$ digit place comprises two bits F13 and F14 and differs with the above four-bit combination. The code combination in $10^3$ digit place is shown in the following TAble 2.

TABLE 2

| code/number | 0 1 2 3 |
|---|---|
| F13 | 1 1 0 0 |
| F14 | 0 1 1 0 |

F0 code is that for checking the weighing beyond its limits. In addition, the code scale 28 is provided with weight graduations 29 for indicating the weight information in analog form to allow the weight of the article to be confirmed.

The above code 28 is so arranged as to swing in the direction shown by arrow, in proportion to the displacement response of the pan 2. In order to convert the displacements of the code scale 28 into digital values, the code scale is irradiated by a slot of light 30 as shown by broken lines. A plurality of photo-detectors PD0–PD14 (FIG. 7) are positioned at the rear of the code scale 28 in such a way that light through the punched portions is sensed by the photo-detectors PD0–PD14.

Figure 7:
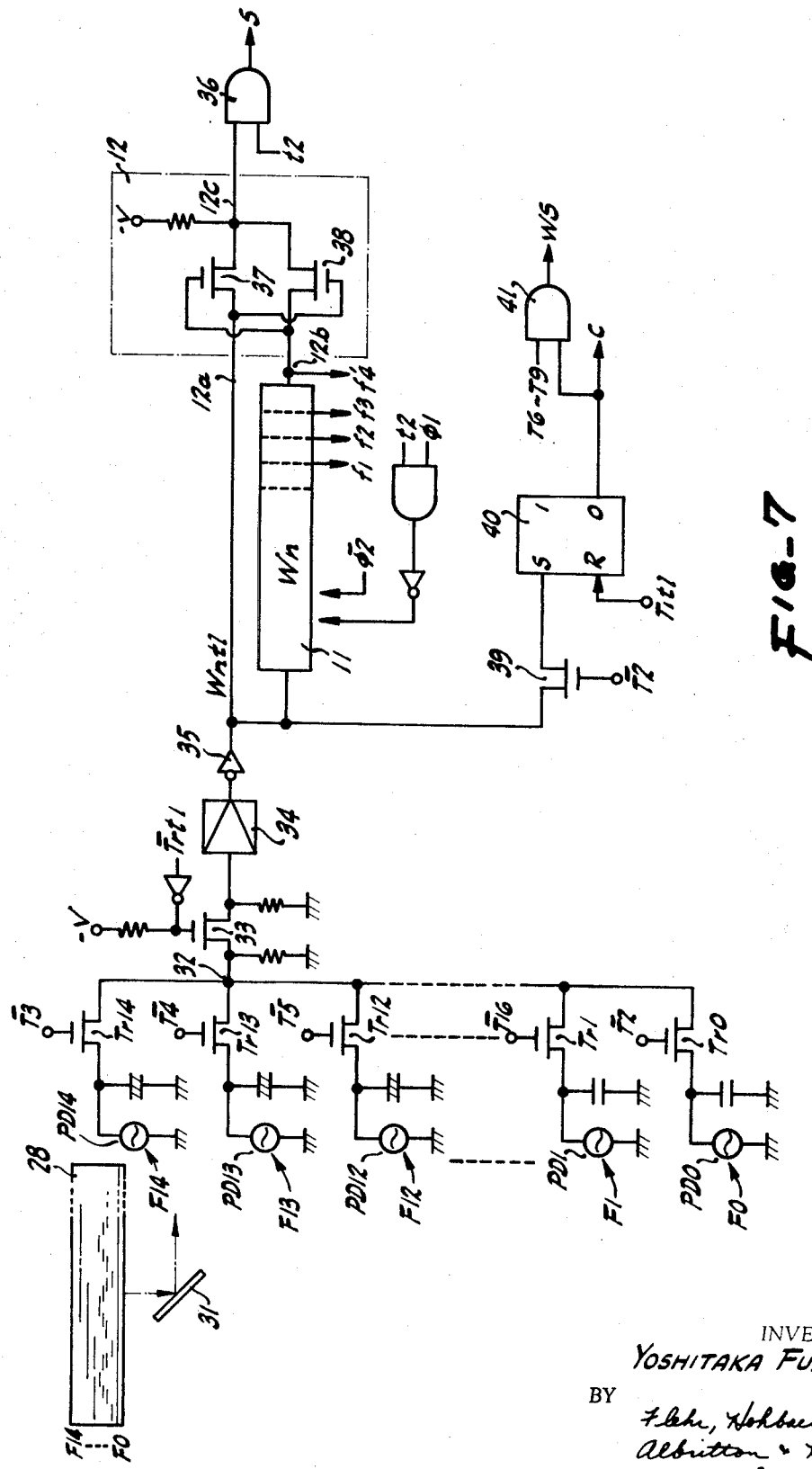
FIG. 7 is a circuit diagram showing a photoelectric weight detection circuit arrangement.

In the circuit arrangement as shown in FIG. 7 the weight information is detected as a train of converted digital signals. The analog displacement of the code scale 28 which is proportional to the weight of the article to be weighed, is converted into digital signals by means of the photo-detectors PD0–PD14 such as solar cells. Namely, the light through slit is applied to the code scale 28. The pattern of the code scale 28 is projected on the photo-detectors PD0–PD14 through a mirror 31 and then converted into an electric value. Each positive pole of the photo-detectors PD0–PD14 is grounded and each their negative poles is respectively connected with one end of the source-to-drain path of the corresponding MOSFET Tr0–Tr14. The other ends of the source-to-drain paths, of the MOSFET are interconnected one with the other to an establish wired-OR gate 32. The changed digital signals are read out as negative logic signals. The digit time signals T2 – T16 are respectively applied to gate electrodes of the MOSFET's Tr0–Tr14, and at the wired OR connection point 32 bits F1 – F14 of the weight information are sequentially read out in descending order of significance, synchronizing with the digit time signals T3 – T16. The bit F0 is led out during a period of the digit time signal T2. The serially converted weight information Wn is only transmitted to an amplifier 34 through a source-to-drain path of the MOSFET 33 during the time period of the bit time signal $t_1$ within digit time signals $\overline{T2}$ – $\overline{T16}$ except T1 and simultaneously amplified. The amplified serial information Wn is converted into positive logic signals by an inverter 35. The converted weight information Wn is next transmitted to 16-bit register 11 and one input line 12a of a comparator 12. An output signal of the least significant digit in the register 11 is transmitted to the other input line 12b of the comparator. Thus, weight information Wn +1 appearing on the output side of the inverter 35 is immediately applied to the comparator 12, while the weight information Wn is applied through the delay register 11 with delay of one word time.

Figure 8A:
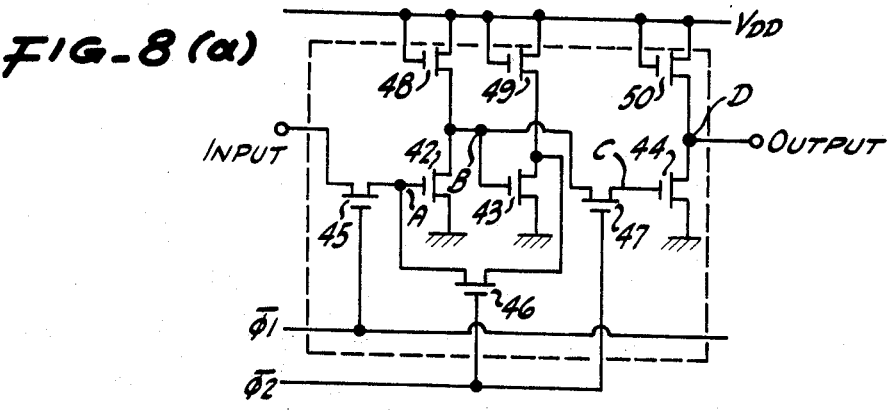
FIGS. 8(a) and 8(b) are circuit diagrams showing one memory cell of registers.
Figure 8B:
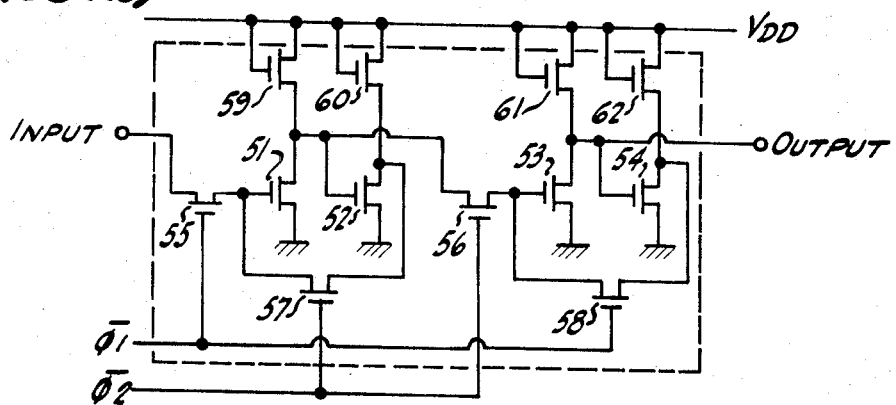

On the application of clock pulse $\overline{\phi 2}$ the register 11 is operative to store the information while on the application of clock pulse $\overline{\phi 1 t2}$ the register 11 is operative to shift the information to the right and to store new information. FIGS. 8(a) and 8(b) represent practical circuit configurations of one bit cell (D-type flip-flop) of the above registers wherein MOSFET's are used as the structural elements. Each MOSFET is utilized as a temporary storage circuit of low power consumption storing information in its gate internal capacitance as an electrostatic charge.

The circuit in FIG. 8(a) is operative to store information on the application of the clock pulse $\overline{\phi 1}$ and to circulate and maintain the stored information on the clock pulse $\overline{\phi\ 2}$. The stored information may be statically maintained only by the application of the clock pulse $\overline{\phi 2}$. Three MOSFET's 42, 43, 44 operate as amplifying elements each having the ability to store information. Three MOSFET's 45, 46, 47 operate as switching elements in response to the clock pulses $\overline{\phi 1}$ and $\overline{\phi 2}$. Another three MOSFET's 48, 49, 50 operate as load register elements for the storing MOSFET's 42, 43, 44.

In a case where parallel four-bit signals must be stored and released at the least significant digit place, a D-type flip-flop as each shown in FIG. 8(b) is employed in the least significant digit place. The circuit configuration in FIG. 8(b) is provided with two information circulating paths each controlled by different clock pulses $\overline{\phi 1}$ and $\overline{\phi 2}$.

The register 11 comprises 12 memory circuits one of which is shown in FIG. 8(a) and four memory circuits one of which is shown in FIG. 8(b). These memory cells are cascade connected and controlled by the clock pulse $\overline{\phi 1 t2}$ instead of the clock pulse $\overline{\phi 1}$. At every lapse of one digit time period the stored information is shifted to the right by one bit position and new bit information is stored. The register 11 is furthermore provided with four output terminals for delivering independently four bit signals f1–f4' (FIG. 7) appearing on the least significant digit place. The output signals f1–f4' are converted into binary coded decimal code signals by the following code converter 13 (FIG. 2) and then stored in the weight register 15.

An output line 12c is connected with an AND gate 36 which is opened by the bit time signal t2 and simultaneously delivers a calculation start pulse S as its output signal. The comparator 12 comprise an exclusive OR gate consisting of two MOSFET's 37 and 38, and delivers "1" output signals to its output line 12c when two input signals on the input lines 12a and 12b do not coincide.

Assume that an output signal of the inverter 35 is "Wn+". Comparing the output signal after passing through delay register 11 with the inverter output signal, timings of both are shifted by one word time and thus have respectively the same bit weight. The information Wn and Wn+1 each having the same bit weight are simultaneously introduced to the comparator 12. When the weight of the article varies due to initial oscillatory movement when the article is placed on the pan, new weight information Wn+1 differs with the stored weight information Wn to permit the exclusive OR gate to bring out a "1" output signal. At the same time the calculation start signal S is read out.

The output signal of the inverter 35 is further introduced to a set input line of R-S type flip-flop 40 through a source-to-drain path of a MOSFET 39 which is in a condition of conduction during the period of the digit time signal T2. The flip-flop 40 is reset by the timing signals T1t1. In a case where the balance is weighing within its limits, a "1" output signal corresponding to F0 code allows the flip-flop 40 to be set at the occurrence of the digit time signal T2. An output signal C therefore becomes "0." Contrarily, in weighing beyond its limit, a "0" signal corresponding to F0 code allows the flip-flop to remain in a reset condition. The reset output signal in this state is introduced to an AND gate 41, which delivers a detection signal WS and inhibits the weight digital indication.

Figure 9:
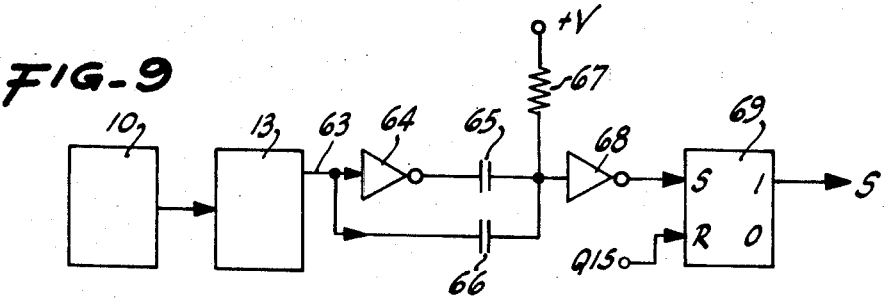
FIG. 9 is a block diagram showing a modification of the weight detection circuit arrangement as shown in FIG. 7.

FIG. 9 shows a modification of the detection circuit which detects variations of the weight information and delivers the calculation start signal S. A weight detector 10 which delivers digital signals corresponding the weight of an article to be weighed, is provided with an A-D converter such as the code scale 28. A code converter 13 performs the function of converting the detected digital signals to other code signals suitable for calculation. As mentioned above, the code converter 13 converts the code signals F1–F14 into the binary coded decimal code signals. However, its output line 63 delivers only the weight information of the least significant ("1" out of "1-2-4-8") in the 10° digit place (1 gram unit). The output line 63 is connected with a differentiation circuit consisting of a capacitor 65 and a resistor 67 through an inverter 64, and immediately with another differentiation circuit consisting of a capacitor 66 and the resistor 67. Two output lines of the differentiation circuit are interconnected one with the other, and with a set input line of a R-S type flip-flop circuit 69 through an inverter 68. A set output line of the flip-flop 69 delivers the calculation start signal S. The flip-flop is reset by a set input signal Q1S of the following flip-flop 73 (FIG. 10) determining the processing step Q1.

According to the circuit arrangement in FIG. 9, with variations of the weight a change of the weight information in the least significant bit place (1 gram unit) appears on the output line 63 without fail; the output signal is changed from "1" to "0" or from "0" to "1." The change of the output signal is differentiated by the differentiation circuit and the flip-flop 69 is reset by this differentiation output signal to permit the calculation start signals to be read out.

Figure 10:
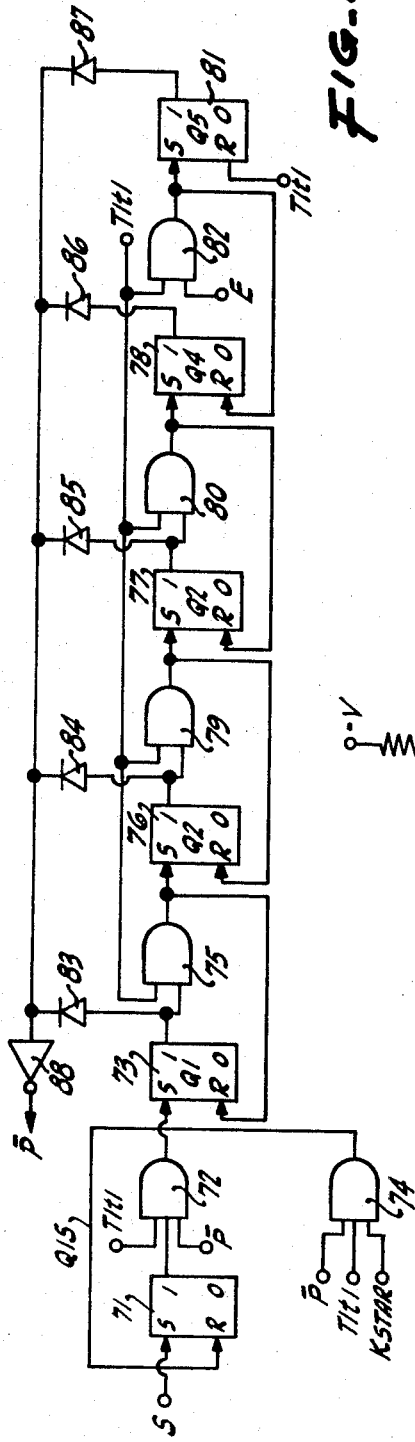
FIG. 10 is a block diagram showing a calculation control circuit arrangement.

Calculation Start and Calculation Control (FIG. 10)

Referring to FIG. 10, the calculation start signal S is transmitted from the comparator 12 to a set input line of calculation control flip-flop 71 which stores temporarily the calculation start signal S. A set output of the flip-flop 71 is applied through an AND gate 72 to a set input line of the flip-flop 73 determining the processing step Q1 during the period of the time signal T1t1 within non-calculation cycle $\overline{P}$. Another start signal K which is delivered on depression of the unit price key 3, is applied to the flip-flop 73 through an AND gate 74. A set input signal for the flip-flop 73 also allows the flip-flop 71 to be set in reset condition. A set output signal is applied through an AND gate 75 to a set input line of a flip-flop 76 determining the processing step Q2 during the period of the time signal T1t1. The flip-flop 73 is reset by this set input signal.

In the same way as the above, three flip-flops 76, 77 and 78 determining the processing steps Q2, Q3 and Q4 are serially connected through AND gates 79, 80. The last flip-flop 81 determining the processing step Q5 is set by signal E indicating a calculation termination during the period of a certain time signal T1t1 and then is reset by bit signal of the next succeeding time signal T1t1. At the same time the flip-flop 78 is reset by a set input signal for the flip-flop 81. Different set output signals of the flip-flops 73, 76, 77, 78 and 81 are applied to a NOT circuit 88 through an OR gate consisted of diodes 83–87. The NOT circuit 88 delivers the signal $\overline{P}$ indicating a non-calculating cycle.

In the above circuit arrangement, variations in the weight information are detected by the comparator 12 and the detected output signal or the calculation start signal S is temporarily stored in the flip-flop 71. In the non-calculation cycle $\overline{P}$ the flip-flop 73 is set at the first time signal T1t1 to make the first processing step Q1 operative. This state is reset at the next succeeding time signal T1t1 after the lapse of one word time thereby to permit the second processing step Q2 to start. The processing step is similarly changed from the second Q2 into the third Q3 after the lapse of one word time and furthermore changed from the third Q3 into the fourth Q4 after the lapse of one word time. In the forth step Q4 the calculation of unit price X weight = price is carried out within less than a hundred word times. At a termination of the price calculation the flip-flop 78 is reset by the termination signal E, as a result of which the processing is changed from the forth step Q4 into the last step Q5. The last step Q5 is reset after the lapse of one word time to permit the NOT circuit 88 to deliver the non-calculation signal $\bar{P}$.

In a case where unit price input key 3 is depressed a series of the processing steps Q1 – Q5 is also established by the other start signal K and price calculation corresponding to the written-in unit price information is carried out. When the weight information varies during the calculation, the start signal S is temporarily stored in the flip-flop 71. After a termination of price calculation corresponding to new weight information is carried out in response to the stored start signal S.

Code Conversion (FIGS. 11 (a) – 11 (e))

The weight information is detected in digital form. The weight information is in Gray code signals and thus is not capable of immediate conversion into the binary coded decimal code signals. The Gray code-to-binary coded decimal code conversion needs a previous decision whether the upper digit to be converted is even or odd in the descending order Considering the conversion from the Gray codes F1–F4 into the binary coded decimal codes A1–D1 (BCD codes), the conversion logic equation is the following:

$$A1 = \overline{(F1 \oplus F2)} \oplus (F3 \oplus F4) \quad (1)$$
$$B1 = \overline{F1} \cdot F2 \quad (2)$$
$$C1 = \overline{F1} \cdot F4 + \overline{F2} \cdot F3 \quad (3)$$
$$D1 = F1 \cdot F4 \quad (4)$$

A series of symbols $A1$-$B1$-$C1$-$D1$ represent 1-2-4-8 codes of the binary coded decimal code. In case that upper digit is odd (a code of 1-2-4-8 code is "1") the above conversion requires inverting the code F4. Thus, the code F4 is inverted according to the following equation:

$$F4' = F4 \,\overline{An+1} + \overline{F4}\, An+1$$
$$= F4 + An+1 \quad (5)$$

In the meantime, the Gray code signals stored in the register 11 are read out as the output signals $f1$–$f3$ and $f4'$ in the ascending order of digit significance. As shown in the following Table 3, the output signals $f1, f2$ which are read out during the period of the time signal T1, coincide with the Gray code signals F13, F14 corresponding to the weight information in the $10^3$ digit place. Parallel output signals which are read out during each period of time signals T5, T9 or T13, coincide respectively with the Gray code signals corresponding to the weight information in the $10^2$, $10^1$ or $10^0$ digit place.

At the digit time signals T1, T5, T9 and T13 four-bit signals of the Gray code signals F1–F14 are respectively read out in parallel as the parallel output signals $f1$–$f3$ and $f4'$ and then converted into 8-4-2-1 code series according to the above equations (1) – (5). The specific converting circuit configurations are shown in FIGS. 11(a) through 11(e).

TABLE 3

|  | f1 | f2 | f3 | f4' |  |
|---|---|---|---|---|---|
| $10^3$ digit place | F13 | F14 |  |  | timing T1 |
| $10^2$ digit place | F9 | F10 | F11 | F12 | timing T5 |
| $10^1$ digit place | F5 | F6 | F7 | F8 | timing T9 |
| $10^0$ digit place | F1 | F2 | F3 | F4 | timing T13 |

The Gray code combination in the $10^3$ digit place differs with that in $10^2$, $10^1$ and $10^0$ digit places. An input terminal at which appears the Gray code signal F14 is, therefore, provided with the time signal T1, as shown in the following FIG. 11(b).

FIG. 11(a) shows a conversion circuit for bit signal A having the "1" weight of the 8-4-2-1 code series. The circuit comprises three exclusive OR gates 91, 92, 93 and a NOT circuit 94. A flip-flop 95 is temporarily set when the upper digit is judged to be odd number, and at the same time delivers a conversion start signal $An$ for the next lower digit.

FIG. 11(b) shows a conversion circuit for the second bit signal B having the "2" weight of the 8-4-2-1 code series. FIGS. 11(c) and 11(d) show conversion circuits for the third and forth bit signals C and D having "4" and "8" weights. FIG. 11(e) shows a circuit configuration embodying the above Equation (5) by means of an exclusive OR circuit 100.

The converted binary coded decimal code signals A-B-C-D are then stored in the weight register 15. In practice, the converted weight information is stored in the register 15 in the descending order of digit significance with left shift operations. The Gray code is more useful for an electronic price indicating balance since only one code bit of its combination corresponding to a certain digit differs with the code of the next succeeding digit and as a result measuring error is extremely reduced.

Figure 12:
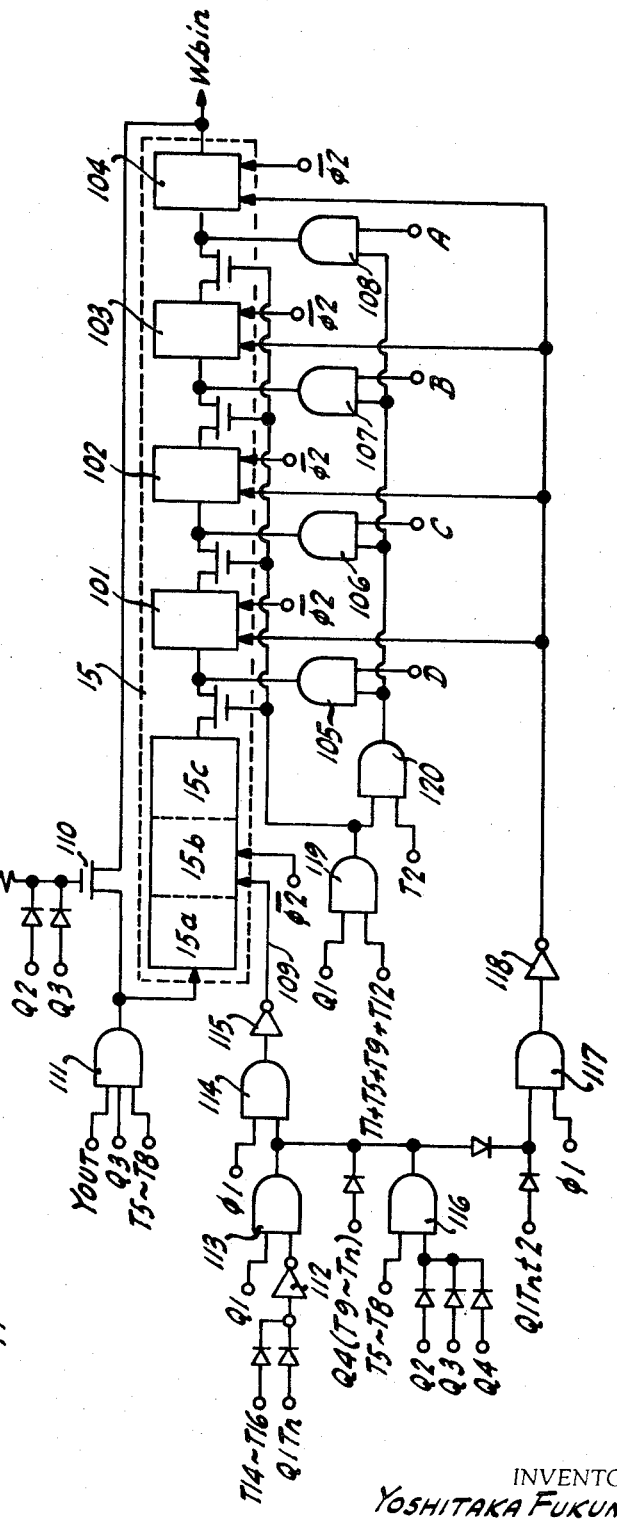
FIGS. 12 and 13 are block diagrams showing a calculation circuit arrangement.
Figure 13:
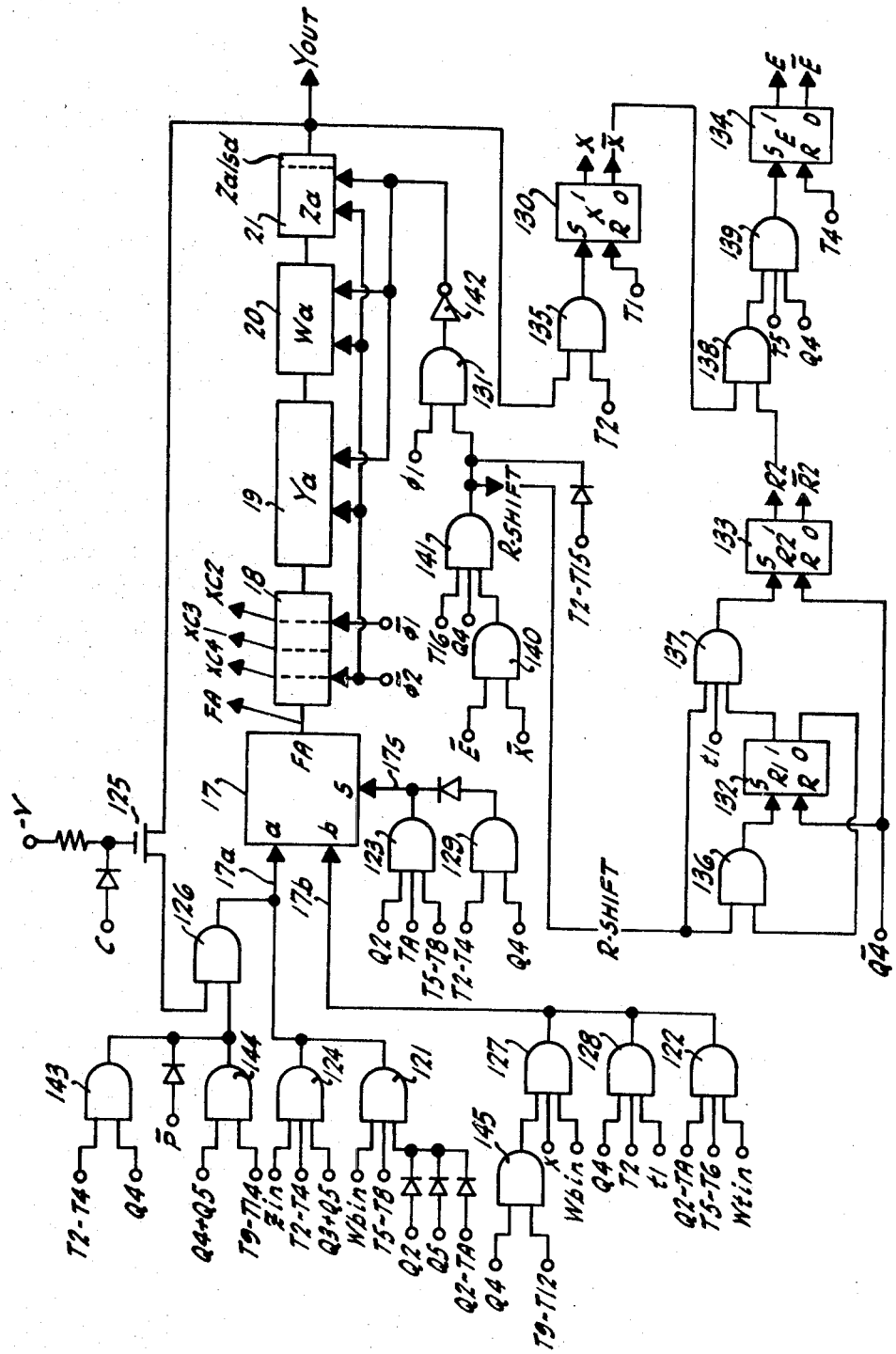
Figure 14:
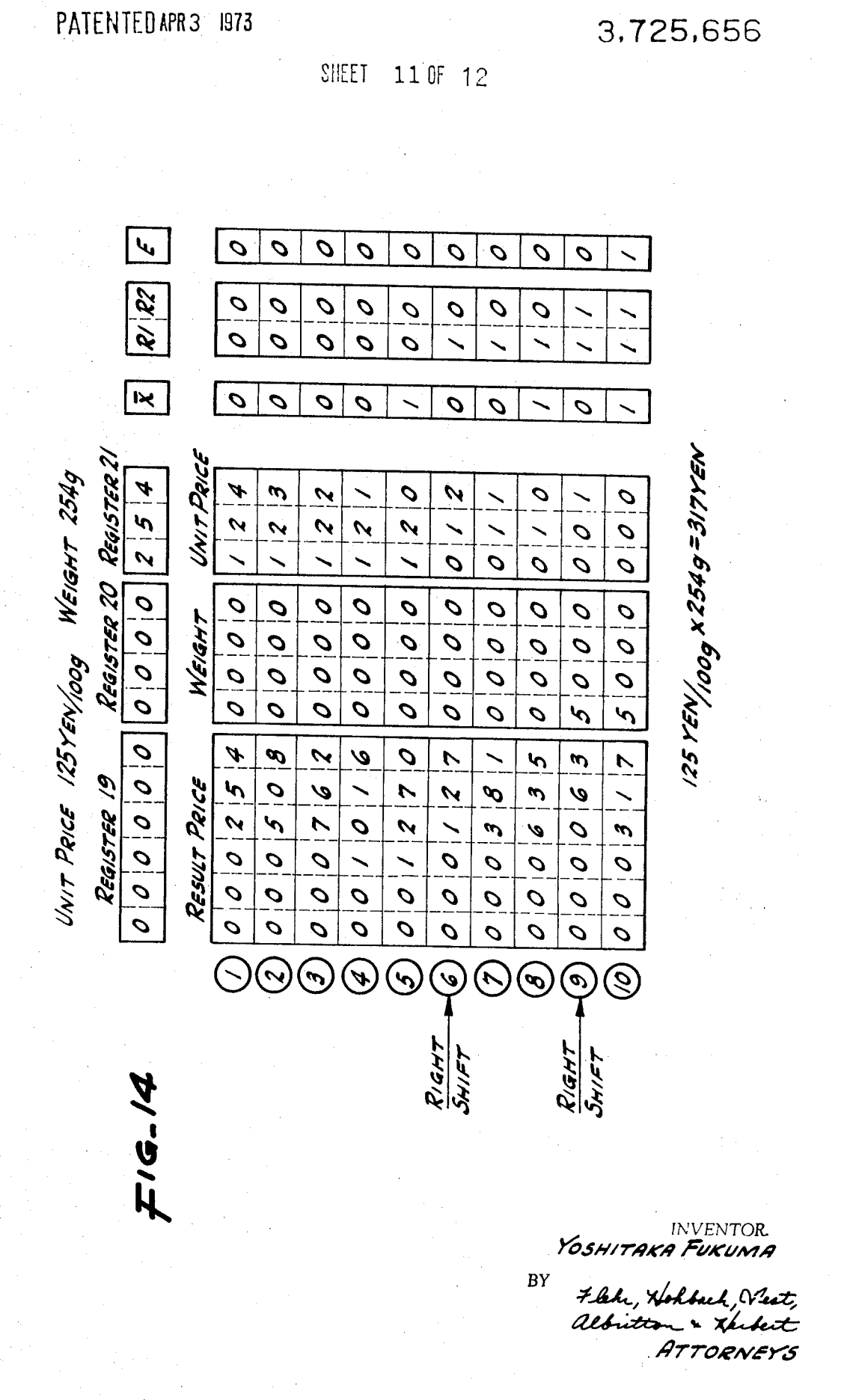

Calculation (FIGS. 12 – 14)

On the application of the calculation start signal S the processing of the first step Q1 is operative and the converted information (binary coded decimal code series) is stored in the first weight register 15.

Referring to FIG. 12, four-bit series of the least significant digit place of the weight register 15 comprise the D-type flip-flops in FIG. 8(b). The parallel four-bit weight signals are stored in the memory cells 101–104 through AND gates 105–108 during the period of the time signal Q1 Tnt2 (Tn; T1+T5+T9+T12). Namely, the weight information in $10^3$ digit place is stored in the lower memory cells 101–104 during the period of the digit time signal T1 within the first step Q1. The modified clock pulses $\bar{\phi}1$ are applied to a control line 109 for the upper register portion 15a–15c during the period of the next digit time signals T2–T4 and the stored information is transferred from the most significant digit place 15a to the succeeding digit place through a transfer gate 110, synchronizing with the modified clock pulses $\bar{\phi}1$. Thus, at timing of the time signal T4 the weight information in the $10^3$ digit place is stored in a memory series 15 c in the second digit place. The modified clock pulses $\bar{\phi}1$ are stopped during the period of the next digit time signal T5 and in the meantime the weight information in the $10^2$ digit place is stored in the least significant digit place. The weight information in the $10^1$ or $10^0$ digit places is respectively stored in the least significant digit place during the period of the time signals T9 or T13. In such a way, binary coded decimal coded weight information is stored in the first weight register 15 during one word time within the first step Q1.

Within the third step Q3 a signal Yout is applied to the weight register 15 through an AND gate 111 and the net weight information stored in the second weight register 20 is transferred to the first weight register 15.

The second step Q2 is next allowed to start. When the tare function key 4 is depressed in a stabilized state of the pan, the stored contents of the first weight register 15 is transferred to the tare register 16. Thereafter whenever new weight information is stored in the first weight register 15, the tare calculation of $\boxed{Wb - Wt}$ is carried out; the weight information Wb in the first register 15 is subtracted by the tare weight information Wt in the tare register 16 to obtain the net weight information W$b$–W$t$. The net weight information is stored in the second weight register 20.

Referring to FIG. 13, on the appearance of tare calculation signal TA an output signal W$b$in of the first weight information 15 is applied to one input line 17$a$ of the full-adder 17 through and AND gate 121, while an output signal Wtin of the tare register 16 is applied to the other input line 17$b$ through an AND gate 122. A subtraction signal is applied to a line 17$s$ of the full-adder 17 through an AND gate 123. The full-adder 17 serves to carry out the tare subtraction calculation and the resulting net weight information is stored in the second weight register 20. But, a tare subtraction of more than 100 grams can not be accomplished since the tare register 16 has only two-digit capacity.

In the next succeeding step Q3 the weight information stored in the second weight register 20 is transferred to the first register 15 through the AND gate 111 as the output signal Yout in order to prepare the price calculation. And, the memory contents Zb of the first unit price register 14 is applied to the adder input line 17$a$ as the output signal Zin of the register 14 through an AND gate 124 and is stored in the second unit price register 21.

The next step Q4 allows the price calculation to be carried out. The price calculation $\boxed{Wb + Ya \rightarrow Ya}$ performs in such a way that the weight information Wb stored in the first weight register 15 is repeatedly added.

As shown in FIG. 13, an output line of the full-adder 17 is connected with a cascade series of the buffer register 18, the price register 19, the second weight register 20 and the second unit price register 21. The output signal Yout of the second unit price register 21 is returned back to the adder input line 17$a$ through a transfer gate 125 and an AND gate 126. The price information Ya stored in the price register 19 is applied to the adder input line 17$a$ during the period of the digit time signals T9–T14. The stored information W$b$ of the first weight register 15 is simultaneously applied to the full-adder 17, resulting in performing the calculation of $\boxed{Ya + Yb \rightarrow Ya}$ The least significant digit of the unit price information Za stored in the second unit price register 21 is applied to the adder input line 17$a$ during the period of the second time signal T2, while the signal T2$t$1 (corresponds to numeral 1) is simultaneously applied to the other adder input line 17$b$ through an AND gate 128. The full-adder 17 is allowed to subtract the least significant digit of the unit price information Za by numeral 1, resulting in performing an operation of $\boxed{Zalsd - 1}$ since the subtract instruction is applied to the adder control line 17$s$ through an AND gate 129.

These calculation operations are repeated, until the least significant digit Za1sd of the second unit price register 21 becomes zero; the output signal Yout becomes zero at timing of the time signal T2 and then a reset output signal of a X flip-flop 130 becomes "1." When the output signal of the flip-flop 130 becomes "1," the transfer control clock pulse $\overline{\phi 1}$ is applied to the second weight and unit price registers 20 and 21 during the period of the time signal T16 to carry out a right shift operation by one digit place.

The shift operation causes the unit price information in the second digit place to be stored in the least significant digit place of the second unit price register 21 at the digit time signal T2. If the second digit of the unit price information is not Zero, a "1" set output signal of the flip-flop 130 is again read out, resulting in further repeating the operations of $\boxed{Ya + Wb \rightarrow Ya}$ and $\boxed{Zalsd - 1}$. The operations corresponding to the unit price information in the third digit place is also carried out.

Shift times are counted by R1 and R2 flip-flops 132 and 133. When the shift operation is carried out two times, R2 flip-flop 133 is set to deliver its set output signal R2. Under conditions of R2 = "1" and Zalsd = "0" an E flip-flop 134 is actuated to set condition to deliver the calculation terminate signal E. On the appearance of the signal E the repeated calculation is stopped to terminate the fourth step Q4.

A fuller understanding of the price calculation may be had by referring to FIG. 14 which shows various placements of the unit price, weight, result price information, and also decisions of the X, R1, R2 and E flip-flops in case of actual calculation, for example, unit price (Za); 125 YEN/100g. weight (W$b$); 254g.

At the termination of the price resulting process the price register 19, and the second weight register 20 respectively store the resulting price information; price information less than a price unit or 1 YEN is not to be ignored. The second unit of price register 21 stores zero. In order to prepare an indication in the next step Q5, the weight information W$b$ of the register 15 is transferred to the second weight register 20 through the AND gate 121 and the unit price information Z$b$ of the unit price register 14 is transferred to the second unit price register 21.

Figure 15:
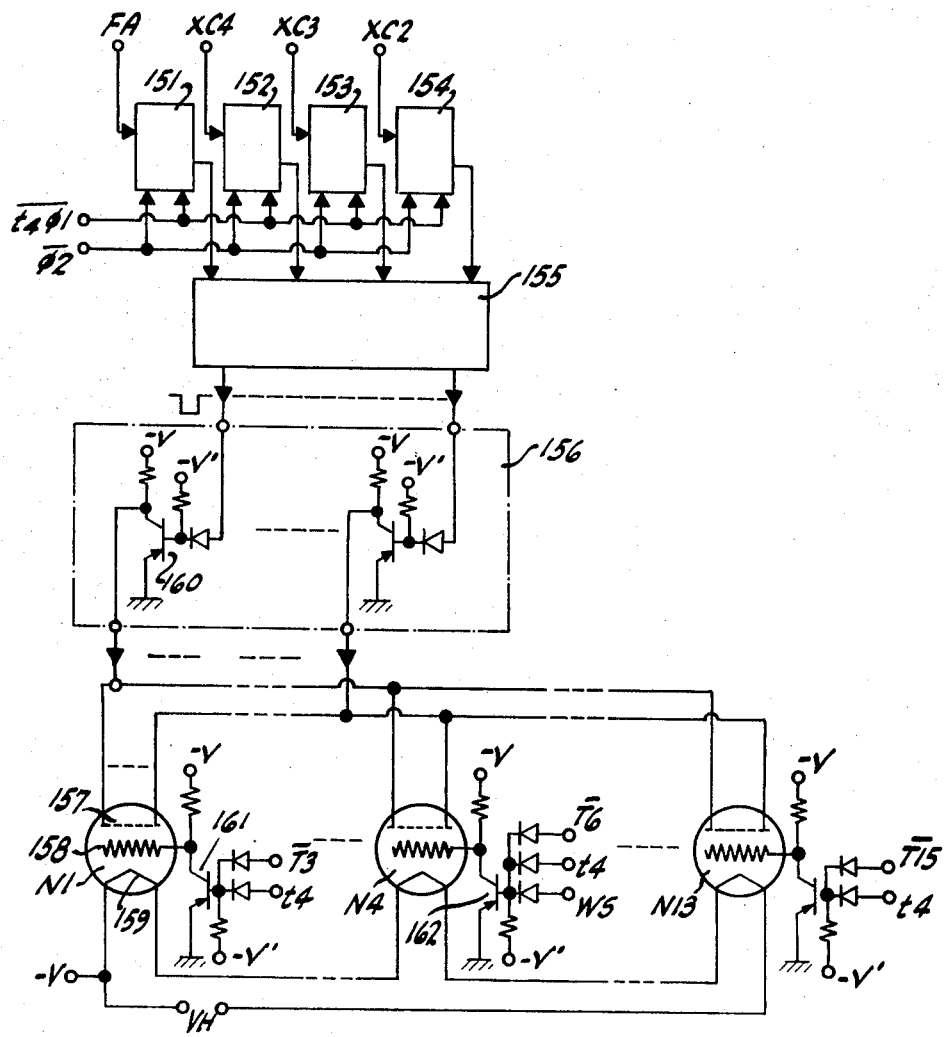
FIG. 15 is a block diagram showing an indication circuit arrangement.

Indication (FIG. 15)

After the termination of the steps Q1-Q5 the device is set in the non-calculation state $\overline{P}$. In the non-calculation state $\overline{P}$ the resulting price information Ya, the weight information Wa and the unit price information Za in the price register 19, the second weight register 20 and the second unit price register 21 is respectively circulated through the transfer gate 125, the AND gate 126, the full-adder 17 and the buffer register 18. Parallel four-bit signals (8-4-2-1 code series) of the circulating information are successively applied to four flip-flops 151–154 through parallel output terminals FA, XC4, XC3 and XC2 at every timing of the bit time signal $t4$ and then are temporarily stored in the flip-flops 151–154 during the period of one digit time. The parallel output signals of the flip-flops 151–154 are introduced to a decoder 155, wherein decoding corresponding to the indication pattern of an indicating device N occurs. Different output signals of the decoder 155 are respectively applied to corresponding numeral segment of the indication tubes N1–N13 in each digit place through a drive circuit 156.

Each indication device N1–N13 consists of a phosphor-type indication tube which comprises phosphor-coated anode segments 157, a grid 158 and a filament 159. High potential is selectively applied to the anode segment 157 and also to the grid 158, while low potential is applied to the filament 159 to permit the desired numeral to be indicated.

The filament 159 is connected with a negative potential source −V. Transistor 160 within the drive circuit 156 is selectively turned ON in response to the output signal of the decoder 15 and thus zero volt potential is applied to the selected anode segment 157. As a result, a predetermined potential occurs between the filament 159 and the anode segment 157. A grid control transistor 161 is connected with the grid 158, and is driven in such a way that the indication tube N1 emits light during the period of the bit time signals $t1-t3$ within the digit time signal T3. The other indication tubes N2-N13 are sequentially driven during the period of the digit time signals T4-T15 in the same way. The numerical information sequentially appearing on the buffer register 18 is dynamically displayed by means of the indication tubes N1-N13. The unit price information read out during the period of the time signals T3-T5 is displayed by the indication tubes N1-N3. The weight and price information respectively read out during the period of the time signals T6-T9 and T10-T15 is similarly displayed by means of the indication devices N4-N7 and N8-N13.

The weight indicating tubes N4-N7 are controlled by the inhibit signal WS. As mentioned above the output signal corresponding to F0 code of the code scale 28 becomes "0" and the flip-flop 40 in FIG. 7 is not set in case of weighing beyond its limits (0-3,000 grams). In this state the flip-flop 40 delivers a reset output signal C, and the AND gate 41 also delivers the inhibit signal WS during the period of the time signals T6-T9. The transfer gate 125 in FIG. 13 is turned OFF in response to the appearance of the reset output signal C and all the memory contents of the price register 19, the second weight register 20 and the second unit price register 21 become zero. Thus, the indication tubes N1-N14 display numeral zero's. In addition, bases of all transistors 162 is biased with zero potential in response to the inhibit signal WS in the grid drive circuit for the weight indicating tubes N4-N7 and thus all the transistor are turned OFF thereby to inhibit the indication of the tubes N4-N7. The indication inhibit makes it possible to indicate to the user the state of unsatisfactory adjustment and/or over weight.

I claim:

1. A price indicating balance comprising means for converting weight of an article to be weighed into electric information, means for introducing unit price information, means for multiplying unit price information by the converted weight information, means for detecting variations of the weight information due to initial oscillatory movement when the article is placed on the balance and also causing the multiplying operation to start by detection of said variations, and means of indicating the resulting price information.

2. A price indicating balance according to claim 1 wherein the detecting means comprises means for temporarily storing the converted weight information, and means for comparing new weight information with the stored weight information.

3. A price indicating balance according to claim 2 wherein the comparating means includes an exclusive OR gate.

4. A price indicating balance according to claim 1 wherein the detecting and causing means comprises means for gating information in a path between the converting means and the multiplying means in response to the detection of said variations.

5. A price indicating balance according to claim 1 further comprising means for temporarily storing variations of the weight information which occurs during the multiplying operation corresponding to previous weight information, and means for causing the multiplying operation corresponding to new weight information to start in response to the variations after the previous multiplying operation.

6. A price indicating balance according to claim 1 wherein the variations of the weight information in the least significant bit place is detected by a differentiation circuit.

7. A price indicating balance according to claim 1 further comprising means for detecting variations of the introduced unit price information and also causing the multiplying operation to start by detection of said variations.

8. A price indicating balance according to claim 1 further comprising means for detecting weighing beyond a predetermined limit and means of inhibiting indication of the indication means in response to the detection signal.

9. A price indicating balance according to claim 1 further comprising means for detecting tare weight and means for subtracting the converted weight information by the tare weight information thereby to obtain net weight information.

10. A price indicating balance according to claim 1 wherein converting means includes a "the Gray code" - to- "binary coded decimal code" converter.

11. A balance comprising means for converting weight of an article to be weighed into electric information consisting of a plurality of bit signals, means for introducing unit price information, means for serially introducing each bit signals of the weight information, means for repeatedly adding the introduced weight information as many times as the unit price information, means for detecting variations of the weight information due to initial oscillatory movement when the article is placed on the balance and also causing the multiplying operation to start by detection of said variations, and means of reading out the resulting price information.

12. A balance comprising means for converting weight of an article to be weighed into electric information consisting of a plurality of bit signals, means for successively introducing each bit signals of the weight information in the descending order of bit significance, means for dynamically storing the introduced weight information, means for comparing newly introduced weight information, means for introducing unit price information, and means for performing a price calculation and causing the price calculation to start.

* * * * *